(12) United States Patent
Ni

(10) Patent No.: US 7,042,843 B2
(45) Date of Patent: May 9, 2006

(54) ALGORITHM FOR TIME BASED QUEUING IN NETWORK TRAFFIC ENGINEERING

(75) Inventor: Shih-Hsiung Ni, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 848 days.

(21) Appl. No.: 09/982,926

(22) Filed: Oct. 22, 2001

(65) Prior Publication Data

US 2002/0122387 A1 Sep. 5, 2002

Related U.S. Application Data

(60) Provisional application No. 60/272,342, filed on Mar. 2, 2001.

(51) Int. Cl.
*G01R 31/08* (2006.01)
*H04L 12/28* (2006.01)
*H04L 12/54* (2006.01)
*H04L 12/56* (2006.01)

(52) U.S. Cl. .................. 370/231; 370/412; 370/389

(58) Field of Classification Search ............. 370/230, 370/232, 235, 236, 412, 418, 428, 537
See application file for complete search history.

(56) References Cited

U.S. PATENT DOCUMENTS

| 5,579,301 A | 11/1996 | Ganson et al. ............... 370/17 |
| 5,828,653 A | 10/1998 | Goss ........................... 370/230 |
| 5,892,922 A | 4/1999 | Lorenz ..................... 395/200.68 |
| 5,918,074 A | 6/1999 | Wright et al. ............... 395/872 |
| 6,119,196 A | 9/2000 | Muller et al. ............... 710/243 |
| 6,185,185 B1 | 2/2001 | Bass et al. .................. 370/230 |
| 6,195,332 B1 * | 2/2001 | Tang .......................... 370/232 |
| 6,452,933 B1 * | 9/2002 | Duffield et al. ............. 370/415 |
| 6,714,517 B1 * | 3/2004 | Fawaz et al. ............... 370/236 |
| 2002/0114274 A1 * | 8/2002 | Sturges et al. ............. 370/229 |

FOREIGN PATENT DOCUMENTS

| EP | 0312917 A2 | 4/1989 |
| EP | 0465090 A1 | 1/1992 |
| EP | 0859492 A2 | 8/1998 |
| EP | 0907300 A2 | 4/1999 |
| FR | 2725573 A1 | 4/1996 |
| WO | WO 99/00948 | 1/1999 |
| WO | WO 99/00949 | 1/1999 |

OTHER PUBLICATIONS

"*Computer Networks*," A.S. Tanenbaum, Prentice-Hall Int., USA, XP-002147300(1998), Sec. 5.2-Sec. 5.3, pp. 309-320.

* cited by examiner

*Primary Examiner*—Alpus Hsu
*Assistant Examiner*—Lina Yang
(74) *Attorney, Agent, or Firm*—Squire, Sanders & Dempsey L.L.P.

(57) ABSTRACT

The present invention provides a method for prioritizing packet flows within a switching network. The method includes the steps of receiving packets at an input port, stamping the packets with an arrival time, and classifying the packet into a flow, wherein the flow is determined based upon at least a class of service of the packet, assigning the packet to a queuing ring according to the flow of the packet, and maintaining a flow ratio pending within the switch based upon the classification of the packet.

21 Claims, 8 Drawing Sheets

ALGORITHM FOR TIME BASED QUEUING IN NETWORK TRAFFIC ENGINEERING

This nonprovisional application claims the benefit of U.S. Provisional Application No. 60/273,342, filed Mar. 2, 2001.

BACKGROUND OF THE INVENTION

1. Field of the Invention

The invention relates to a method and apparatus for high performance switching in a network system such as token ring, ATM, ethernet, fast ethernet, gigabit ethernet environments, LANs, WANs and other known data communication routing network systems. In particular, the invention relates to a system and method for prioritizing packet flows within a network.

2. Description of the Related Art

The Internet Protocol (IP) is the underlying protocol for routing packets over the Internet and other TCP/IP-based networks. Recent innovations in the IP has transcended the Internet into a global network that provides a universal method of packaging information for delivery across an endless variety of network systems and transmission media. In fact, the ease and popularity of communicating via the Internet has placed greater demands on the IP to transmit a variety of data at an extremely high transmission rate. Many applications that currently run on the IP can function with whatever bandwidth they obtain from the network because they have elastic bandwidth requirements. In the Internet community, such applications are typically supported by best-effort services. The global IP is a best-effort service because it delivers packets of information across the network with no guarantee that those packets will arrive on time, arrive in a particular order, or arrive at all. In addition, communications over the IP may be made through a connectionless or a stateless service. A connectionless service exists when no prior agreement is made between the sender and the receiver to watch over or manage the delivery of a packet. A stateless connection occurs when the sender does not retain any information about the client that might be used to maintain a connection or to assist in the next requests. No information is cached in expectation of the user's next request. In contrast to a stateless connection, a stateful connection is a connection in which some information about a connection between two systems is retained to maintain the current connection or to use for future connections.

Unfortunately, such connectionless and stateless connections may cause transmission problems for some of the new breed of Internet applications, such as multimedia, which require significant bandwidth for transmission. Other applications, such as IP telephony and other real-time or two-way transmissions, may also suffer from a connectionless or stateless connection because these applications also have very strict transmission timing requirements. These time-sensitive applications typically require the rapid transmission of voice or video packets over the network during a real-time or two-way communication between two or more network users. For instance, IP telephony relates to the products, standards, and techniques for carrying voice calls over the Internet.

To mitigate the transmission problems associated with voice and video packets, some network designers have suggested increasing the bandwidth. However, increasing the bandwidth alone is not a sufficient solution to address the current demands on the IP. Therefore, what is needed is a novel method of providing a level of assurance to the network that its Quality of Service (QoS) can be satisfied. A QoS guarantee warrants the timely delivery of information on networks, control bandwidth, set priorities for selected traffic, and provide a good level of security. QoS is usually associated with being able to deliver time-sensitive information such as live video and voice while still maintaining enough bandwidth to deliver other traffic, albeit at a lower transmission rate. Managing the QoS within a network usually requires prioritization of the packets, which relates to scheduling the traffic of some packets so that the packet maneuvers through congested networks before the traffic flow of lower-priority packets.

SUMMARY OF THE INVENTION

The present invention provides a method for prioritizing packet flows within a switching network. One embodiment of the invention includes a method, which contains the steps of receiving a packet at an input port, stamping the packet with an arrival time, and classifying the packet into a flow, wherein the flow is determined based upon at least a class of service of the packet, assigning the packet to a queuing ring according to the flow of the packet, and maintaining a flow ratio pending within the switch based upon the flow of the packet.

Another embodiment of the invention is drawn to a switch configured to prioritize and route a packet through a communication system. The switch includes an input port for receiving a packet from an input source, a time stamp for stamping the packet with an arrival time, and a classification module for determining the flow of a packet, wherein the flow is determined based upon at least a class of service of the packet. The switch also contains a queuing module for assigning the packet to a queuing ring according to the flow of the packet and a flow control module for maintaining a flow ratio pending within the switch based upon the flow of the packet.

An alternate embodiment of the invention includes a method of prioritizing and routing a packet through a communication system. The method includes the steps of receiving a packet at an input port, stamping the packet with an arrival time, determining a flow of the packet, wherein the flow is determined based upon at least a class of service of the packet, assigning the packet to a queuing ring according to the flow of the packet, and maintaining a flow ratio pending within the switch based upon the flow of the packet.

Furthermore, another embodiment of the invention includes a switch configured to prioritize and route a packet through a communication system. The switch contains an input port for receiving a packet from an input source and an output port for transmitting the packet to an output destination. The switch includes a queuing module configured to determine a flow of the packet, and to assign the packet in a queue based upon the flow of the packet, wherein the flow is determined based upon at least a class of service of the packet. The switch contains a scheduling module configured to schedule the transmission of the packet from the queue within a selected time interval before the transmission of a next outgoing packet. The switch also includes a flow control module configured to maintain a flow ratio pending within the switch based upon the flow of the packet, and to control a transmission rate of the packet from the output port based upon the flow of the packet. The switch contains a conflict determination module configured to determine if a conflict exists when the packet is scheduled to be transmitted from the output port. The switch includes a threshold indicator module configured to provide a threshold status based upon the flow ratio, and a transmission module to transmit the packet from the output port according to the schedule determined by the scheduling module.

An alternative embodiment the invention includes a method for prioritizing packet flows. The method includes the steps of receiving a packet into an input port, transmitting the packet from an output port, determining a flow of the packet, and assigning the packet in a queue according to the flow of the packet. The method also contains the steps of scheduling the transmission of the packet from the queue within a selected time interval before the transmission of a next outgoing packet, maintaining a flow ratio pending within the switch based upon the flow of the packet, and controlling the transmission rate of the packet from the output port based upon the flow of the packet. The method further includes the steps of determining if a conflict exists between the packets when the packet is scheduled to be transmitted from the output port, providing a threshold status based upon the flow ratio, and transmitting the packet from the output port within the selected time interval.

BRIEF DESCRIPTION OF THE DRAWINGS

The objects and features of the invention will be more readily understood with reference to the following description and the attached drawings, wherein.

DETAILED DESCRIPTION OF THE PREFERRED EMBODIMENTS

Figure 1:
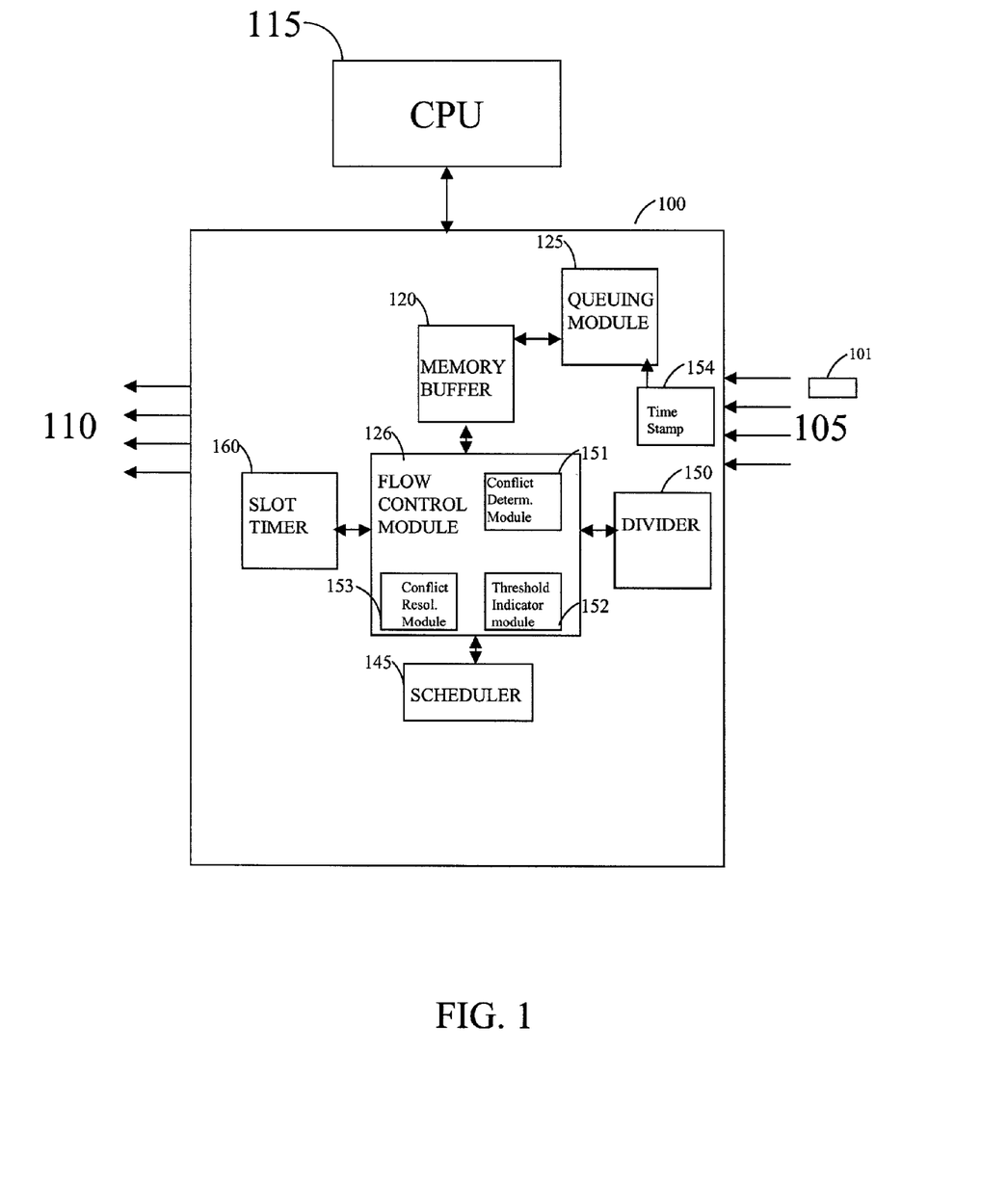
FIG. 1 is a simplified diagram of a switch according to one embodiment of the invention.

FIG. 1 depicts a simplified block diagram of an exemplary embodiment of a switch 100 utilizing an arbitration scheme configured to prioritize the flow of the packets, which may be employed in the invention. The input ports 105 and output ports 110 of the switch 100 may be coupled to one or more physical layers via respective interfaces and to a central processing unit (CPU) 115 in order to route fixed-size packets, i.e., cells, as well as variable-sized packets. This configuration may enable the switch 100 to control the exchange of a single packet or a plurality of packets 101 with any physical layers connected thereto. Various types of well-known products may be incorporated into the invention for performing switching-related functions at various levels of the OSI 7-layer reference model. For example, hubs or repeaters may operate at layer one, and essentially copy and "broadcast" incoming data to a plurality of spokes of the hub. Layer two switching-related devices are typically referred to as multiport bridges, and are capable of bridging two separate networks. Bridges may be incorporated into the invention to build a table of forwarding rules based upon which MAC (media access controller) addresses exist on which ports of the bridge, and may pass the packets which are destined for an address which is located on an opposite side of the bridge. Bridges typically utilize what is known as the "spanning tree" algorithm to eliminate potential data loops; a data loop is a situation wherein a packet endlessly loops in a network looking for a particular address. The spanning tree algorithm defines a protocol for preventing data loops. Layer three switches, sometimes referred to as routers, may be employed to forward the packets based upon the destination network address. Layer three switches are capable of learning addresses and maintaining tables thereof which correspond to port mappings. Processing speed for layer three switches may utilize specialized high performance hardware, and off load the host CPU so that instruction decisions do not delay packet forwarding.

In order for the invention to regulate the influx of the packets, a memory buffer 120 may be provided for buffering incoming packets. At the start of a switch cycle, a packet 101 received at the input ports 105 from an input source (not shown) may be time-stamped, sent to a queuing module 125 for classification, and then stored at the buffer memory 120. The packet 101 may be presented to the queuing module 125 so that the queuing module 125 may check the header to determine the flow information of the packet. The flow information may be classified based on information such as the class of service and the destination address for the packet. The class of service may indicate whether the packet is a video, voice or a best effort packet. The class of service may also specify other characteristics of the data packet, such as the jitter, latency, bandwidth and packet loss rate requirement. The flow information of each packet may be determined by examining one or more fields contained in the packet header.

Figure 2A:
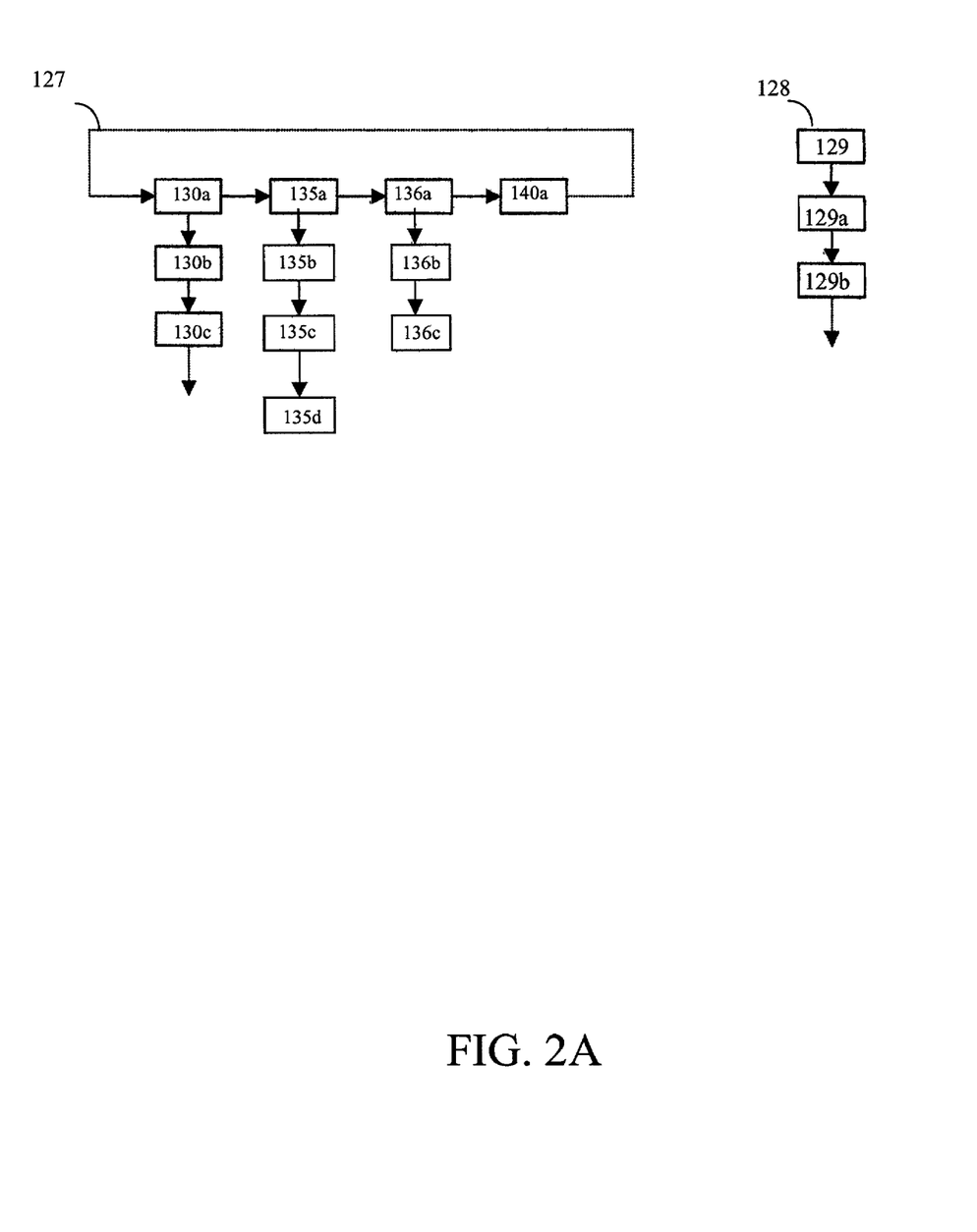
FIGS. 2A and 2B are examples of rings of link list pointers, which may be employed in an embodiment of the invention.

One of the objectives of the invention is to handle effectively at least three types of traffic: voice, video and best effort. Each packet 101 upon entry at the input ports 105 is therefore classified according to its flow and each packet is sent to respective traffic queues based upon its flow, as shown in FIG. 2A. In contrast to the time-sensitive mandates of voice and video applications, best effort services are typically transmitted across networks with no guarantee that these packets will arrive on time, arrive in order or arrive at all. Although best effort services are not confined to the strict timing schedule of a voice or video packet, a network system cannot starve the transmission of the best effort packets by imposing an extended delay upon the transmission of the best effort packets. The switch 100 controls the scheduling of the transmission of the packets so that all classes of packets are transmitted in a timely manner.

Upon arrival into the system, the packet may be sliced into cells (not shown) having a predetermined fixed size. If so, when a read request is received to transmit the packet out of the system, the cells of the packets must be re-assembled. Therefore, when the packets are initially received at the input ports 105, the queuing module 125 may retrieve a pointer from a link list and assign the pointer to each incoming packet or the cells of the packet. Although the description uses the term "packets," it should be construed to mean either a fixed-size cell or a variable-sized packet. The assignment of the pointer from the link lists to an incoming packet may provide a link list addressing scheme which defines the storage location of the packet so that the packet may be retrieved and reassembled for transmission out of the output ports 110. Therefore, the invention may determine the class of service of a packet to indicate the flow of the packet.

Since the transmission of both voice and video packets are time-sensitive, the invention may provide a list of pointers, which are assigned to the incoming packets, so that the queuing module 125 may queue the packets for transmission, as shown in FIG. 2A. The link list pointers may be assigned to each incoming packet and configured to resemble a ring configuration 127, as shown in FIG. 2A.

Figure 2B:
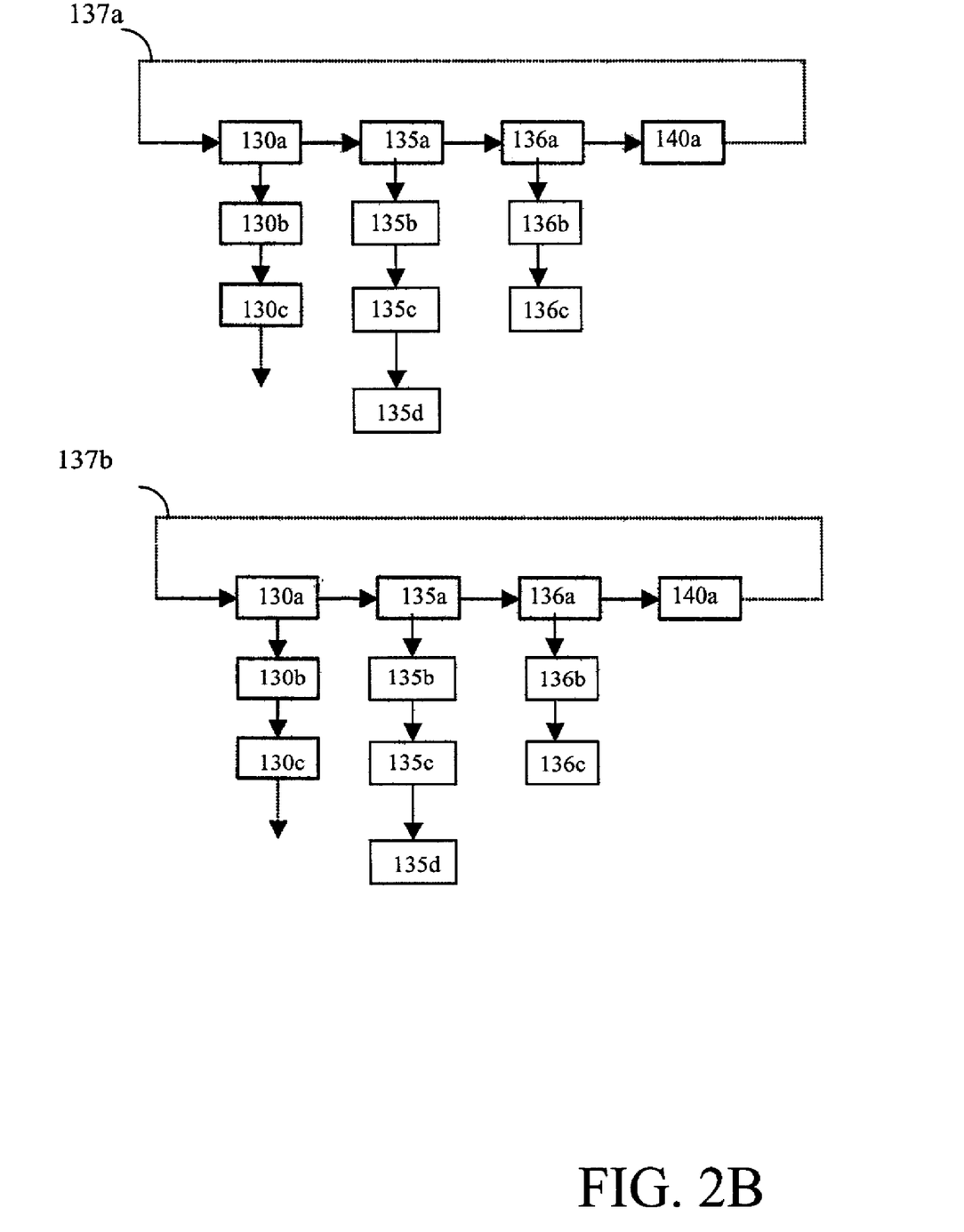

Each head pointer 130a, 135a, 136a, 140a in the ring represents a specific class of service (flow) for the packets. The linking elements 130b, 130c extending from the head pointer 130a belongs to the same class of service (flow). Similarly, the linking elements $135_{b-d}$ and $136_{b-c}$ extending from the head pointers 135a, 136a, respectively, belong to the same class of service. In this manner, each flow can be scheduled for transmission independently and appropriately. If a packet having a new class of service (flow) enters the system, the invention creates and attaches a new header pointer to the ring 127. Otherwise, the pointer is added to the link list having the same class of service. Since voice packets are usually smaller in size (64 bytes) with shorter interval requirements (10 ms end to end across the network) in comparison to video packets, which are usually larger in size (512 bytes) with longer interval requirements (100 ms end to end across the network), in an alternative embodiment, as shown in FIG. 2B, the invention may be configured to establish two separate and independent rings: a ring 137a for the voice packets and a ring 137b for the video packets.

As illustrated in FIG. 2A, the best effort traffic may be queued in a separate link list 128. The pointers of the best effort traffic may also be assigned to include a header 129a and depending packets 129b, 129c. Alternatively, the invention may be configured so that a single ring of link list pointers handles the video, voice and the best effort packets.

Figure 4:
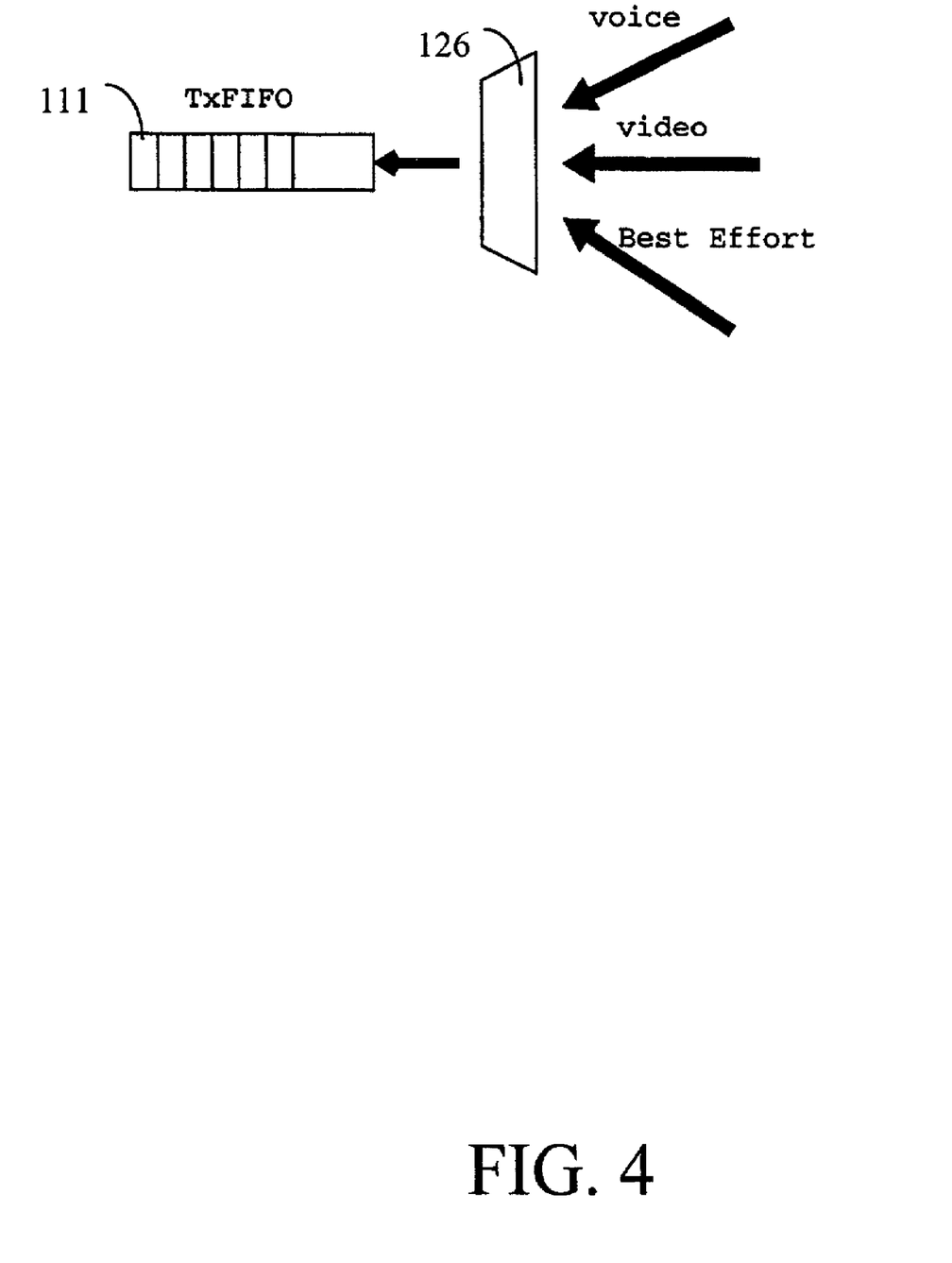
FIG. 4 is an illustration of packets exiting the switch at the output port.

As shown in FIGS. 1 and 4, when an egress port's TxFIFO 111 has a sufficient capacity to transmit packets from the network system, the egress port 111 will issue a read request to transmit a packet from the memory buffer 120. A central scheduler 145, shown in FIG. 1, may inspect the ring 127 and select which pointer to service at a dynamically determined interval. Both the voice and the video ring may contain a user programmable interval number which is the maximum time interval allowable between successive transmissions of either voice or video packets before a voice or video degradation situation will occur due to an excessive time delay in transmitting the requested packet. For example, a voice or video degradation may occur during a live two-way voice conversation or a video transmission if the next voice or video packet is not transmitted in a timely fashion. Each head pointer 130a, 135a, 136a and 140a, shown in FIGS. 2A and 2B, in the rings 127, 137a, 137b include at least two variables; last-time-serviced and next-service-time. The last-time serviced plus the maximum interval time equals the next-service-time, which is the latest allowable time that a packet from the flow of a class of service should be transmitted from the queue before the transmission interval requirement for the class is violated. Typically, voice data has a 10 ms transmission interval requirement, and video data has a 100 ms transmission interval requirement. However, since these requirements are from end to end across the network, the scheduler 145 may be configured so that the user may preprogram the maximum interval time required for the transmission of the packet for each class of service (flow).

One challenge facing the conventional time based queuing (TBQ) schemes is how to space out the transmission intervals (gaps) between the voice and video packets, while interleaving the best effort traffic into the transmission so that all three types of traffic will receive adequate amount of transmission services without experiencing any starvation, latency or jitter violations. One embodiment of the invention provides a switch which includes an algorithm that is capable of addressing this problem.

Figure 3:
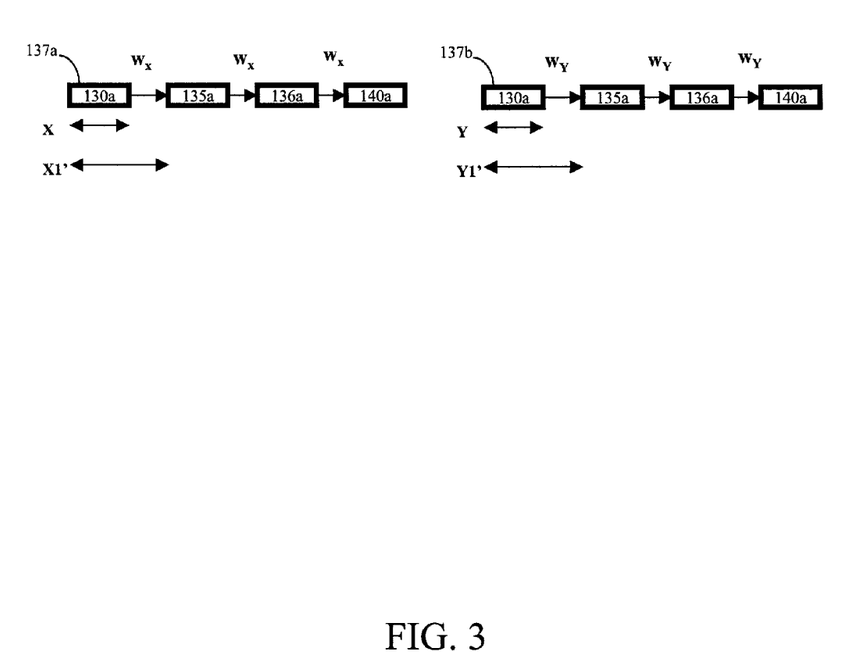
FIG. 3 is an illustration depicting the transmission gap between adjacent packets.

Referring to FIG. 3, x illustrates the voice packet transmission time, x1 equals x plus the gap ($w_x$) between the headers 130a, 135a, 136a, 140a of the voice data packets of ring 137a, y equals the video packet transmission time, and y1 equals y plus the gap ($w_y$) between the headers 130a, 135a, 136a, 140a of the video data packets of ring 137b.

The invention also includes a method as to how the invention may manipulate the flows of the packets to accommodate the addition of a packet having a new class of service (flow) added to the rings 127, 137a, 137b. Namely, one embodiment of the invention provides a method of calculating the gap (w), which is the distance between the headers packets 130a, 135a, 136a, 140a of the flows, when a header packet of a flow is added or deleted from a ring 127, 137a, 137b. The invention may establish that the term $i_m$ illustrates the maximum interval time and that (f) represents the number of class of services (flows). Therefore, the gap (w) times (f) the number of the class of service (flows) is less than or equal to the $i_m$. Since the $i_m$ may be a fixed, predetermined number, which may be preprogrammed by the user. As the number of class of service (flows) of packets that enters the switch 100 increases, the gap (w) between the transmission of the adjacent packet flows must decrease. In other words, as more flows of packets enter the switch 100, the switch 100 must increase the rate at which the time-sensitive packets 101 are transmitted from the queue. To optimize the QoS of the switch 100, the invention may regulate the flows of the packets by maintaining a certain ratio of voice and video flows to enter the input ports 105 to strike a predetermined balance of multimedia traffic, i.e., voice or video, and best effort traffic. The invention may employ a divider 150 to maintain the ratio.

One embodiment of the invention may begin to establish the gap (w)=the maximum interval time ($i_m$) divided by the number of flows (f) in the ring, when the switch 100 receives the first packet into the system. Namely, this embodiment begins with the first flow and sets, for example, the gap (w) to equal the $i_m$ divided by two, if there are two types of flows assigned to the ring. For each subsequent new class of service (flow) added to the ring, this embodiment may continue to transmit the packet at a rate having a gap (w), until the number of the class of service (flows) in the system reaches a predetermined number, for example, if the number of the class of service (flows) doubles the original number of flows (f) assigned to the ring. Then, the invention may recalculate the gap (w), in this example, so that the recalculated gap ($w_r$) equals the gap (w) divided by 2. By employing this method, the invention is able to compensate for an increase in the number of flows entering in the system by adjusting the transmission interval of the gap (w) as the flow increases. Thus, this embodiment may maintain a proportional mixture of multimedia and best effort traffic within the system. When the number of class of services (flows) within the system begins to decrease again, this embodiment may once again recalculate the gap (w) so that transmission interval decreases. For example, if the number of class of services (flows) reduces by a factor of two, this embodiment may double the transmission rate to have a gap (w) by multiplying by a factor of two. This embodiment of the invention may be employed using, for example, a simple register shifting or a divider.

Another novel feature of the invention is that the system may also be capable of addressing the issue of priority within an arbitration scheme. In conventional devices, the natural priority of transmitting packets according to class of service is voice first, video second, and best effort (BE) third. However, a network device that employs this invention may be a multi-port device, where each port will have separate queues for voice, video, and BE traffic. All three queues from all ports may request service at the same time, which may generate a conflict between the packets contending for access to a particular output port, as shown in FIG. 4. A contention for output ports is known to produce Head-of-Line (HOL) blocking problems and congestion problems.

HOL blocking is a phenomenon that may occur in an input buffered switch wherein a packet is temporarily blocked by another packet or packets either at the input buffer or at the output buffer. HOL reduces the effectiveness of the transfer rate. One of the objectives of flow control is to inhibit the sending station or host from sending additional packets to a congested port for a predetermined amount of time. While a flow control scheme is expected to ease congestion, it may also aggravate the Head-of-Line (HOL) blocking problem by causing additional transmission delays.

The issue then becomes how does a system manage the scheduling of the transmission of the packets so that no voice or video transmission interval violation occurs and no best effort starvation occurs. An embodiment of the invention addresses this issue by providing a method to restrict the total number of active class of services (flows) for voice and video packets so that 1) the maximum wait time for any port's voice/video queue is less than or equal to the maximum transmission interval ($i_m$), 2) the process of interleaving voice, video and best effort traffic does not delay the transmission of the next voice/video packet transmit time, and 3) the process does not starve the video and best effort traffic for service.

To achieve these objectives, this embodiment of the invention may determine the minimum spacing requirement between the adjacent video and voice packets, respectively. When a port of the switch 100 becomes congested, the switch 100 may employ a flow control module 126 to control the flows by maintaining a predetermined ratio between the voice and video flows. The parameters that trigger the flow control procedure can be static or dynamically adjusted, depending on the traffic flow. The flow control module 126 may include a conflict determination module 151, a threshold indicator module 152, and a conflict resolution module 153. The conflict determination module 151 may determine if a conflict exists between the packets when a packet is scheduled to be transmitted from the output port. The threshold indicator module 152 may provide a threshold for the ratio between voice and video flows. If a conflict does exists as determined by the conflict determination module 151 and either the voice or video flows exceed the programmed threshold, the conflict resolution module 153 either instructs the scheduler 145 to drop from the output port the next outgoing packet of the voice or video flow that exceeds its threshold or instructs the input port to deny entry into the system of packets that belong to a new voice or video flow.

To implement the flow control, this embodiment of the invention begins by establishing a high and low ratio. The invention may include a separate memory buffer for each class of service or all of the packets for all of the classes may be stored in a single memory buffer. If a single memory buffer is utilized, the link list may function to differentiate as to where the packets of each class of service (flow) are stored in the memory buffer. The thresholds may be established by the threshold indicator module 152 to indicate that there are too many voice flows or too many video flows within the system. For example, the low threshold may be set to indicate that there are too many video packets in the system. Likewise, the upper threshold may indicate that there are too many voice data packets in the system. Other threshold scenarios may be established within the scope of the invention. For instance, both an upper and a lower threshold may be established for both the voice and video data packets, respectively. Once a congestion occurs and if the congestion persists, the conflict resolution module 153 of the flow control module 126 instructs the scheduler 145 to start dropping the packets of the violating flows from the queue. The thresholds may be programmed into the threshold indicator module 152 so that the flow control module 126 maintains a ratio of the flows of the video packets to the voice packets pending in the system. For example, the ratio may be established so that the upper and lower thresholds may be 1/8 or 1/32—that is, one video packet for every eight voice packets or one video packet for every thirty-two voice packets is permitted to enter the system. When the threshold of the ratio is exceeded, in order to maintain the ratio, the control flow module 126 may adjust the number of the flows permitted to enter the system or begin to drop packets from the transmission queue. The ratio may be preprogrammed as a predetermined number. Alternatively, the ratio may be dynamic to adjust to the number of class of services (flow) within the system depending upon the time of the day, week, month or another time setting.

Figure 5:
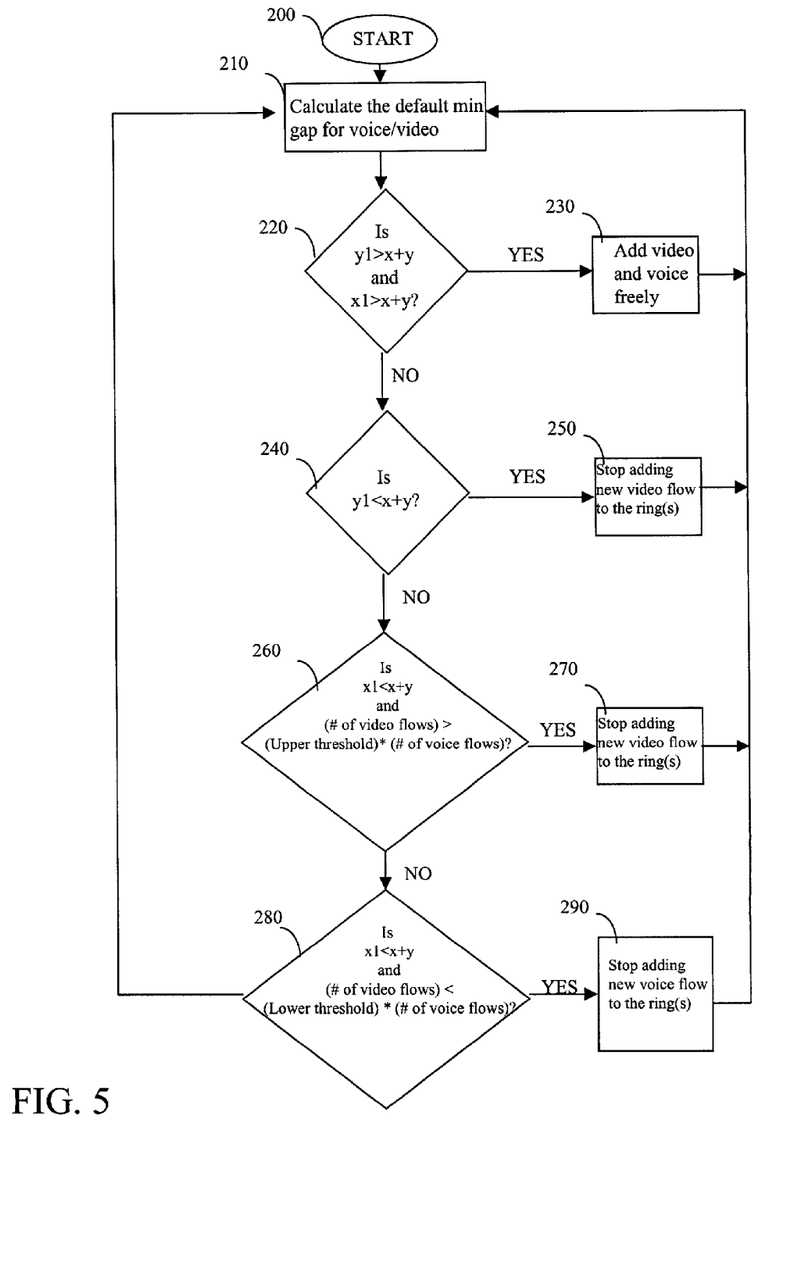
FIGS. 5, 6A and 6B are flow charts illustrating one example of the method according to the invention.

In the flow diagram of FIG. 5, a discussion of one example as to how the invention may employ the thresholds to determine the optimum flow spacing and dynamically prioritize the selection in the arbitration scheme for scheduling of the transmission of the packets out of the output port 110 will now be provided.

For instance, assume that the network device contains (k) number of entries of packets stored in the buffer memory 120. The process begins at step 200. Initially at step 210, this example of the invention uses the divider 150 to calculate the default minimum gap ($W_D$) for the voice and video flows, respectively. The default minimum gap ($W_D$) equals the maximum interval time ($i_m$) divided by (k) the number of packets stored in the buffer memory. The user may preprogram the maximum interval time ($i_m$). Alternatively, the maximum interval time may be set as a default to the conventional standard. If the conventional default values are used, the default minimum voice gap $W_{DVOICE}$ equals 10 ms/k, and the default minimum video gap $W_{DVIDEO}$ equals 100 ms/k.

Next at step 220, this example may determine if additional voice or video flows can be added to the system by determining the current gap (w) between the headers 130a, 135a, 136a, 140a for each class of service (flow). If the queuing module 125 determines that the conditions of (y1>x+y) and (x1>x+y) are satisfied, this means that size of the gap (w) between the flows is large enough to accept additional flows of the data packets into the system. The process advances to step 230 so that voice and/or video packets may be added freely to the system.

At step 240, if (y1<x+y), this means that there are too many video data packets, since video packets are usually much larger than voice packets. Thus, at step 250, the system stops, for example, adding new class of services (flow) for the video packets to the queue by instructing the input ports 105 to deny access to any new class of service (flow) of the video packets. However, the system may still permit video data packets of already existing classes of service (flows) to continue to enter the system.

If neither of the above conditions is true, the process advances to step 260 to examine the condition of the voice flow. If the process determines that (x1<x+y) and that ((number of the flows of the video packets)>the upper threshold*(number of the flows of the voice packets)), the process precedes to step 270 and begins to prevent the addition of any new video flows into the input ports 105. For example at step 270, the system may prevent the addition of any new flows of the video packets. However, the system may still permit video packets of already existing classes of service (flows) to continue to come into the system. For example, the system may already contain video packets having a jitter requirement established as category 1, and a new flow of video packets having a jitter requirement established as category 2 seeks entry to the system. However, if the process at either step 250 or step 270 determines that there are currently too many video packets in the system, entry of the new video packets having a jitter requirement of category 2 may be denied entry into the system. Meanwhile, the system may continue to permit the video packets having a jitter requirement of category 1 to enter the system.

At step 280, if the process determines that (x1<x+y) and that ((number of the flows of the video packets)<lower threshold*(number of voice flow)), the flow control module 126 recognizes that there are too many voice flows in the system. Thus, at step 290, the system may stop, for example, adding new class of services (flows) for the voice packets to the queue by instructing the input ports 105 to deny access to any new flow of the voice packets. However, the system may still permit voice data packets of already existing flows to continue to enter the system.

Figure 6A:
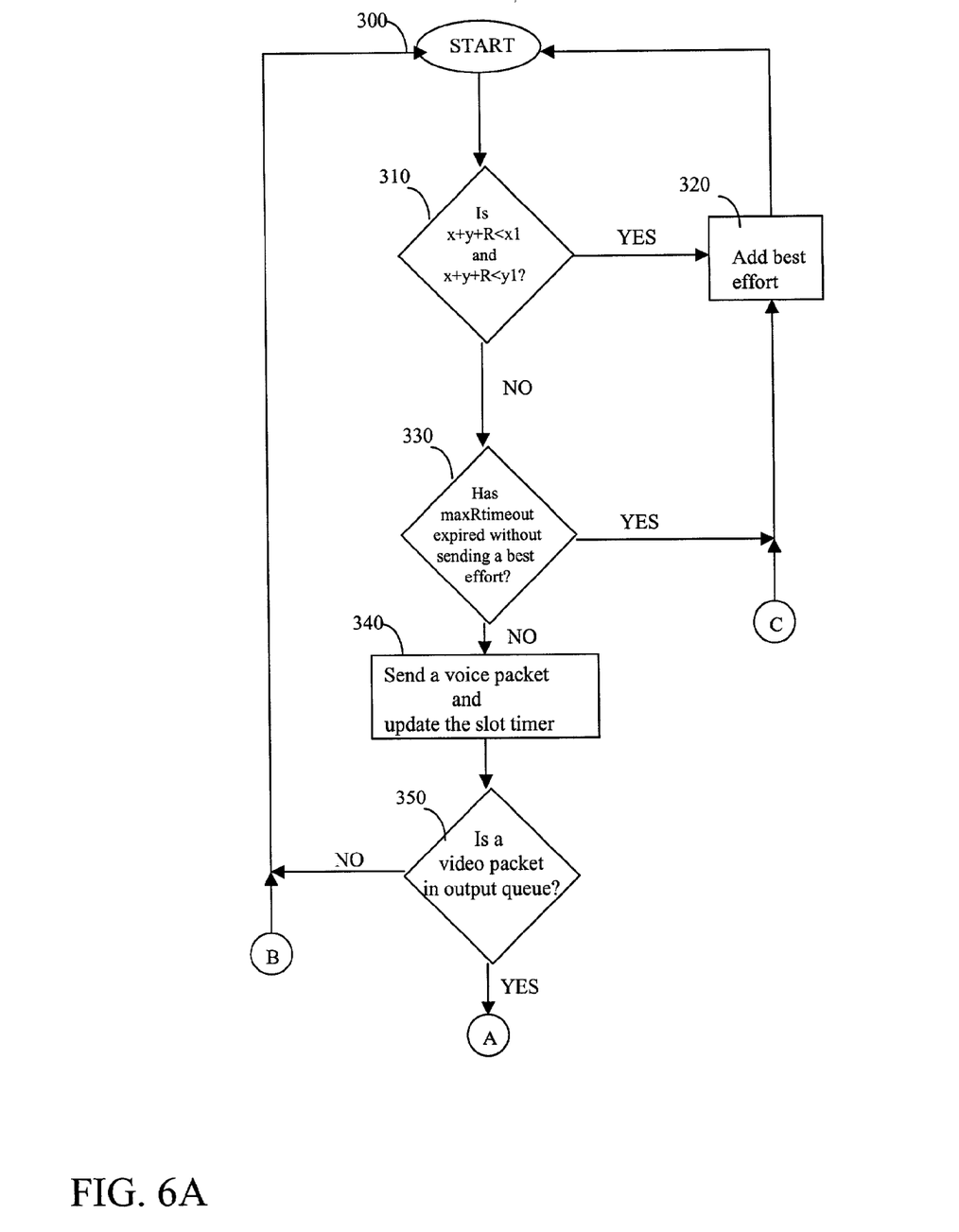

A discussion will now be provided regarding one example of how the invention may interleave the best effort traffic into the transmission of the video and voice packets. As shown in FIG. 6A, after the process begins at step 300, the process instructs the queuing module 125 to determine at step 310 the size of the gap (w) that is available between the headers 130a, 135a, 136a, 140a within the rings 127, 137a, 137b. At step 310, if the queuing module 125 determines the conditions of (x+y+R<x1) and (x+y+R<y1) are satisfied, where R is the transmission time of current best effort packet, this means that the size of the gap (w) between the headers 130a, 135a, 136a, 140a within the rings 127, 137a, 137b is adequate to permit the best effort packets to be interleaved with the voice and video packets so that the best effort packets may be transmitted out of the system. Thus, the process advances to step 320 and instructs the scheduler 145 to transmit the best effort packets freely.

The invention may also include a default maximum transfer time interval for the best effort (BE) packets (maxRtimeout) to prevent best effort traffic starvation. The maxRtimeout may be configured as a programmable value, which the user may preprogram. In step 330, if a best effort packet is not transmitted within the maxRtimeout, after the expiration of the maxRtimeout, the invention will automatically advance to step 320 and transfer a best effort packet.

Every time a packet is queued to the TxFIFO (transmit first-in, first out) queue 111 (FIG. 4), this embodiment may employ a slot timer detecting mechanism 160 to predict, based upon the length of the packet, the time that it will take to transfer the packet. When the invention knowingly transmits video or best effort packets that the slot timer detecting mechanism 160 predicts will delay the next voice or video packet, the flow control module 126 may instruct the scheduler 145 to drop all delayed voice and video packets pending at the output queue. For instance, the invention may employ an aging function to drop all packets having a next service time-stamp older than the current slot time.

As the invention attempts to negotiate the transfer of the voice, video and best effort packets, the flow control module 126 may determine when to drop a packet from the output queue, as shown in FIG. 6A at step 340. In determining which packets to drop or delay, the process may follow the typical transmission of voice first, video second and then best effort. Accordingly, the process may initially transmit a voice packet, and updates the slot timer. However, other transmission sequencing schemes may be configured.

Figure 6B:
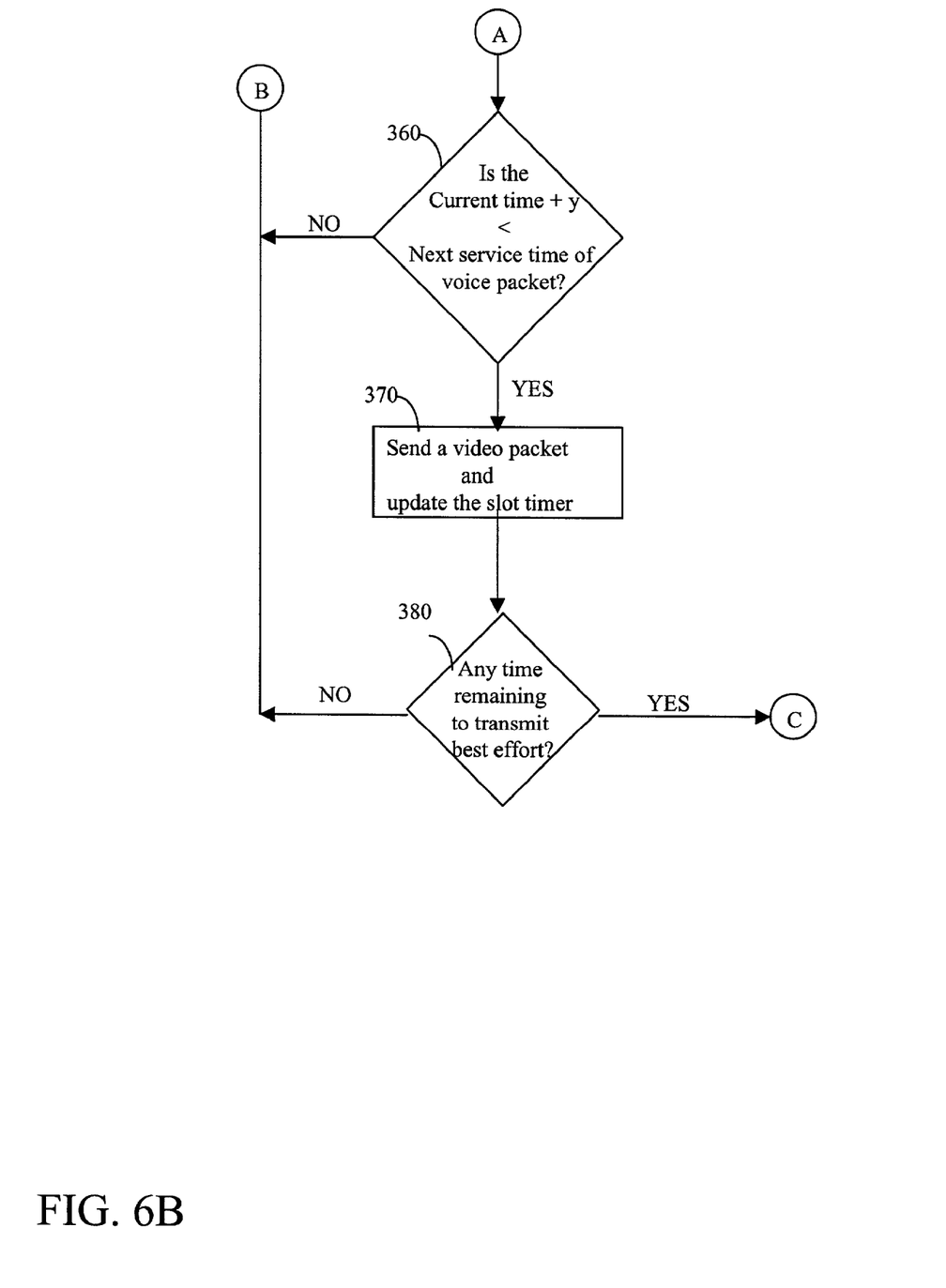

Then, at step 350, the process may check to determine if there are any video packets waiting at the output queue 106. If yes, the process advances to step 360 (FIG. 6B) to determine whether the current time plus the video packet transmission time (y) is less than the next service time of voice packet. If so, the process advances to step 370 and transmits the pending video packet. Then, the process updates the slot timer 160. Next, the process instructs the flow control module 126 to determine at step 380 if there is sufficient time remaining to transmit any best effort packets. If so, the process moves to step 320 and transmits the best effort packets.

As an alternative or in conjunction with the arbitration schemed discussed herein, one embodiment of the invention may provide the user with the option to put all time based traffic into the best effort queue, and conduct a Weighted Round Robin arbitration for voice, video, and best effort packets.

The invention may provide a time based queue (TBQ) algorithm that may specify the manner in which the packets are queued and scheduled to satisfy the manuevering of the data packets having strict real time requirements. Specifically, the invention may construct plural rings, for example, two rings, of link lists as data structure to handle the voice and video traffic, as shown in FIG. 2B, and a separate link list for best effort traffic 128. The algorithm of the invention may define the criteria to accept, queue, and schedule packets in each type of traffic, including the transmission intervals, the flow number control, and dynamic queue priority selection.

The invention may provide numerous advantages. For instance, the invention may provide a time based queuing mechanism that provides a QoS for timesensitive traffic such as voice and video traffic. By adding a time stamp 154 to each packet and each queue and intelligently monitoring and scheduling the transmission time of these packets, the invention is capable of satisfying the stringent latency and jitter timing requirements of multimedia traffic. The invention may be tailored toward per flow buffer management, which adds significant flexibility in quality of service. Specifically, the invention may construct rings of link lists as data structure to handle the voice and video traffic, and a separate link list for best effort traffic, with specific guidelines in accepting, queuing, prioritizing, and scheduling packets in each type of traffic. The invention may also create a flexible and dynamic process in managing the mixture of voice, video, and best effort traffic to achieve the quality of service each traffic type requires. Many variables of the algorithm of the invention may be user programmable, which enables individual users to fine tune the performance of the algorithm in different networking environments. The ability to default all or a portion of the scheduling back of the best effort and employ a Weighted Round Robin priority scheme to schedule traffic is another added flexibility of the invention.

Although the invention has been described based upon these preferred embodiments, it would be apparent to those of skilled in the art that certain modifications, variations, and alternative constructions would be apparent, while remaining within the spirit and scope of the invention. In order to determine the metes and bounds of the invention, therefore, reference should be made to the appended claims.

We claim:

1. A method of prioritizing packet flows within a switch, said method comprising the steps of:
   receiving a packet at an input port;
   stamping the packet with an arrival time;
   classifying the packet into a flow, wherein the flow is determined based upon at least a class of service of the packet;
   assigning the packet to at least one queuing ring according to the flow of the packet, wherein the queuing ring comprises at least one list of pointers, each list of pointers being assigned to a specified flow and a head pointer in each of the at least one list represents the specified flow; and
   maintaining a flow ratio pending within the switch based upon the flow of the packet,
   wherein a gap between head pointers of the list of pointer is calculated when one head pointer is added or deleted from the queuing ring.

2. The method as recited in claim 1, wherein the flow ratio is based upon a number of voice packets compared to a number of video packets pending within the switch.

3. A switch for prioritizing and routing a packet through a communication system, said switch comprising:
   an input port for receiving the packet from an input source;
   a time stamp for stamping the packet with an arrival time;
   a classification module for determining a flow of the packet, wherein the flow is determined based upon at least a class of service of the packet;
   a queuing module assigning the packet to at least one queuing ring according to the flow of the packet, wherein the queuing ring comprises at least one list of pointers, each list of pointers being assigned to a specific flow, wherein a head pointer in each list represents the specific flow; and
   a flow control module for maintaining a flow ratio pending within the switch based upon the flow of the packet,
   wherein a gap between head pointers of the list of pointer is calculated when one head pointer is added or deleted from the queuing ring.

4. The switch as recited in claim 3, wherein the flow ratio is based upon a number of voice packets compared to a number of video packets pending within the switch.

5. A switch for prioritizing and routing a packet through a communication system, said switch comprising:
   receiving means for receiving a packet at an input port;
   stamping means for stamping the packet with an arrival time;
   determining means for determining a flow of the packet, wherein the flow is determined based upon at least a class of service of the packet;
   queuing means for assigning the packet to at least one queuing ring according to the flow of the packet, wherein the queuing ring comprises at least one list of pointers, each list of pointers being assigned to a specific flow, wherein a head pointer in each list represents the specific flow; and
   maintaining means for maintaining a flow ratio pending within the switch based upon the flow of the packet,
   wherein a gap between head pointers of the list of pointer is calculated when one head pointer is added or deleted from the queuing ring.

6. The switch as recited in claim 5, wherein the flow ratio is based upon a number of voice packets compared to a number of video packets pending within the switch.

7. A switch for prioritizing and routing a packet through a communication system, said switch comprising:
   an input port for receiving a packet from an input source and an output port for transmitting the packet to an output destination;
   a queuing module configured to determine a flow of the packet and assign the packet in at least one queuing ring based upon the flow, wherein the flow is determined based upon at least a class of service of the packet and the queuing ring comprises at least one list of pointers, each list being assigned to one flow, wherein a head pointer in each of the at least one list represents a specific flow;
   a scheduling module configured to schedule the transmission of the packet from the queue within a selected time interval before the transmission of a next outgoing packet;
   a flow control module configured to maintain a flow ratio pending within the switch based upon the flow of the packet, and to control a transmission rate of the packet from the output port based upon the flow of the packet;
   a conflict determination module configured to determine if a conflict exists when the packet is scheduled to be transmitted from the output port;
   a threshold indicator module configured to provide a threshold status based upon the flow ratio; and
   a transmission module to transmit the packet from the output port according to the schedule determined by the scheduling module.

8. The switch as recited in claim 7, wherein the flow ratio is based upon a number of voice packets compared to a number of video packets pending within the switch.

9. The switch as recited in claim 8, further comprising:
   a conflict resolution module configured to instruct the scheduling module, if the conflict exists and the flow ratio exceeds the threshold, to drop from the output port the next outgoing packet of the flow that exceeds the threshold.

10. The switch as recited in claim 8, further comprising:
    a conflict resolution module configured to instruct the scheduling module, if the conflict exists and the flow ratio exceeds the threshold, to deny entry into the input port of a next incoming packet belonging to a new voice flow or a new video flow.

11. The switch as recited in claim 9, further comprising:
    a conflict resolution module configured to instruct the scheduling module, if the conflict exists and the flow ratio exceeds the threshold, to select for transmission the packet from the flow which does not exceed the threshold.

12. A method of prioritizing packet flows, comprising the steps of:
    receiving a packet into an input port;
    transmitting the packet from an output port;
    determining a flow of the packet, wherein the flow is determined based upon at least a class of service of the packet;
    assigning the packet to at least one queuing ring according to the flow of the packet, wherein the queuing ring comprises at least one list of pointers, each list being assigned to one flow, wherein a head pointer in each of the at least one list represents a specific flow;

scheduling the transmission of the packet from the queue within a selected time interval before the transmission of a next outgoing packet;

maintaining a flow ratio pending within the switch based upon the flow of the packet;

controlling a transmission rate of the packet from the output port based upon the flow of the packet;

determining if a conflict exists when the packet is scheduled to be transmitted from the output port;

providing a threshold status based upon the flow ratio; and transmitting the packet from the output port within the selected time interval.

13. The method as recited in claim 12, wherein the flow ratio is based upon a number of voice packets compared to a number of video packets pending within the switch.

14. The method as recited in claim 13, further comprising the steps:

instructing the scheduling module, if the conflict exists and the flow ratio exceeds the threshold, to drop from the output port the next outgoing packet of the flow that exceeds the threshold.

15. The method as recited in claim 13, further comprising the steps:

instructing the scheduling module, if the conflict exists and the flow exceeds the threshold, to deny entry into the input port of a next incoming packet belonging to a new voice or video flow.

16. The method as recited in claim 13, further comprising the steps:

instructing the scheduling module, if the conflict exists and the flow ratio exceeds the threshold, to select for transmission the packet from the flow which do not exceed the threshold.

17. A switch for prioritizing and routing a packet through a communication system, the switch comprising:

receiving means for receiving a packet into an input port;

transmitting means for transmitting the packet from an output port;

determining means for determining a flow of the packet, wherein the flow is determined based upon at least a class of service of the packet;

assigning means for assigning the packet in at least one queuing ring according to the flow of the packet, wherein the queuing ring comprises at least one list of pointers, each list being assigned to one flow, wherein a head pointer in each of the at least one list represents a specific flow;

scheduling means for scheduling the transmission of the packet from the queue within a selected time interval before the transmission of a next outgoing packet;

maintaining means for maintaining a flow ratio pending within the switch;

controlling means for controlling a transmission rate of the packet from the output port based upon the flow of the packet;

determining means for determining if a conflict exists when the packet is scheduled to be transmitted from the output ports;

providing means for providing a threshold status based upon the flow ratio; and transmitting means for transmitting the packet from the output port within the selected time interval.

18. The switch as recited in claim 17, wherein the flow ratio is based upon a number of voice packets compared to a number of video packets pending within the switch.

19. The switch as recited in claim 18, further comprising:

instructing means for instructing the scheduling module, if the conflict exists and the flow ratio exceeds the threshold, to drop from the output port the next outgoing packet of the flow that exceeds the threshold.

20. The switch as recited in claim 18, further comprising:

instructing means for instructing the scheduling module, if the conflict exists and the flow ratio exceeds the threshold, to deny entry into the input port of a next incoming packet belonging to a new voice or video flow.

21. The switch as recited in claim 18, further comprising:

instructing means for instructing the scheduling module, if the conflict exists and the flow ratio exceeds the threshold, to select for transmission the packet from the flows which do not exceed the threshold.

* * * * *